Nov. 14, 1939. J. SIVERTSEN 2,180,175
METHOD OF AND APPARATUS FOR MEASURING SMALL CHANGES IN LENGTH
Filed May 28, 1937 3 Sheets-Sheet 1
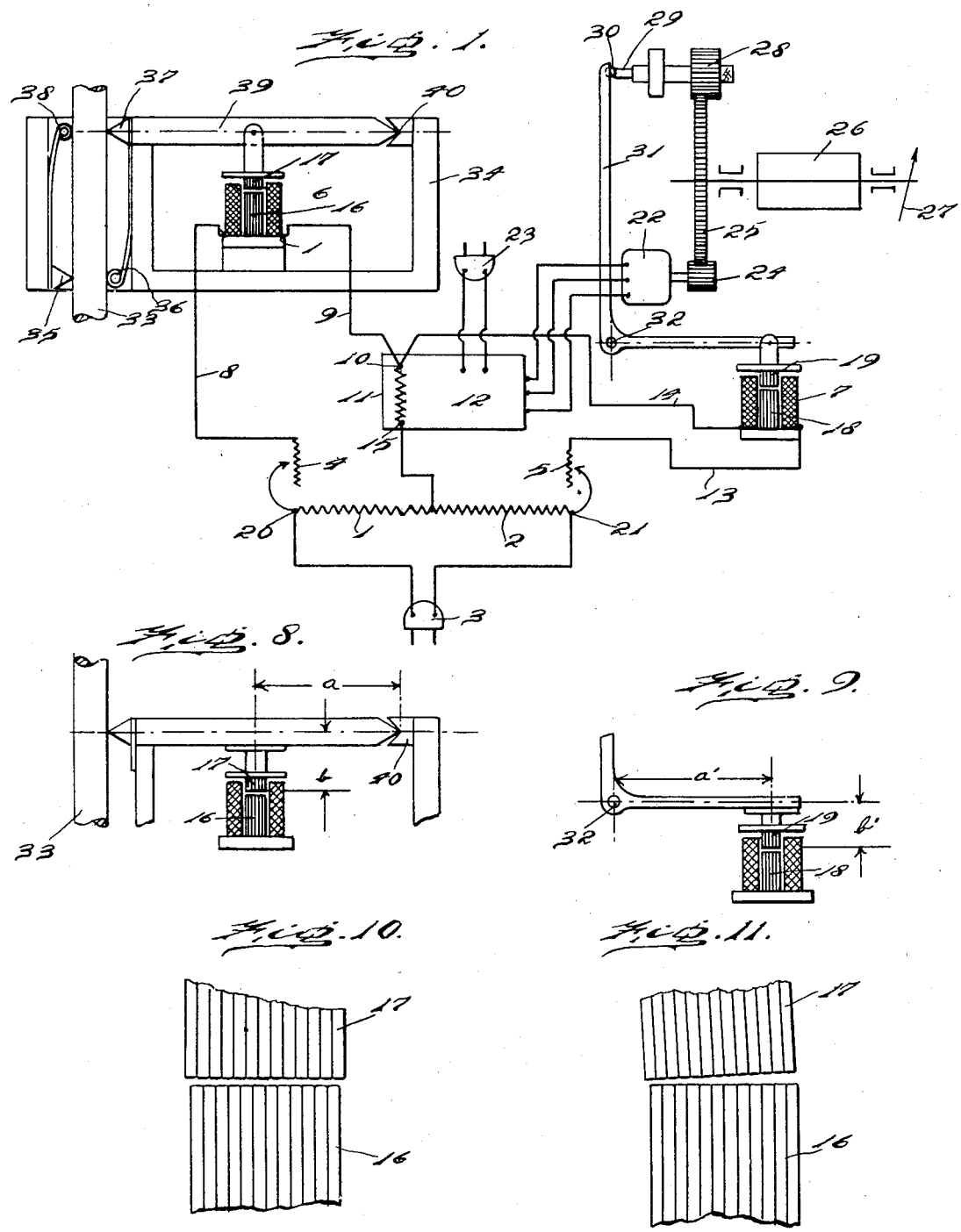

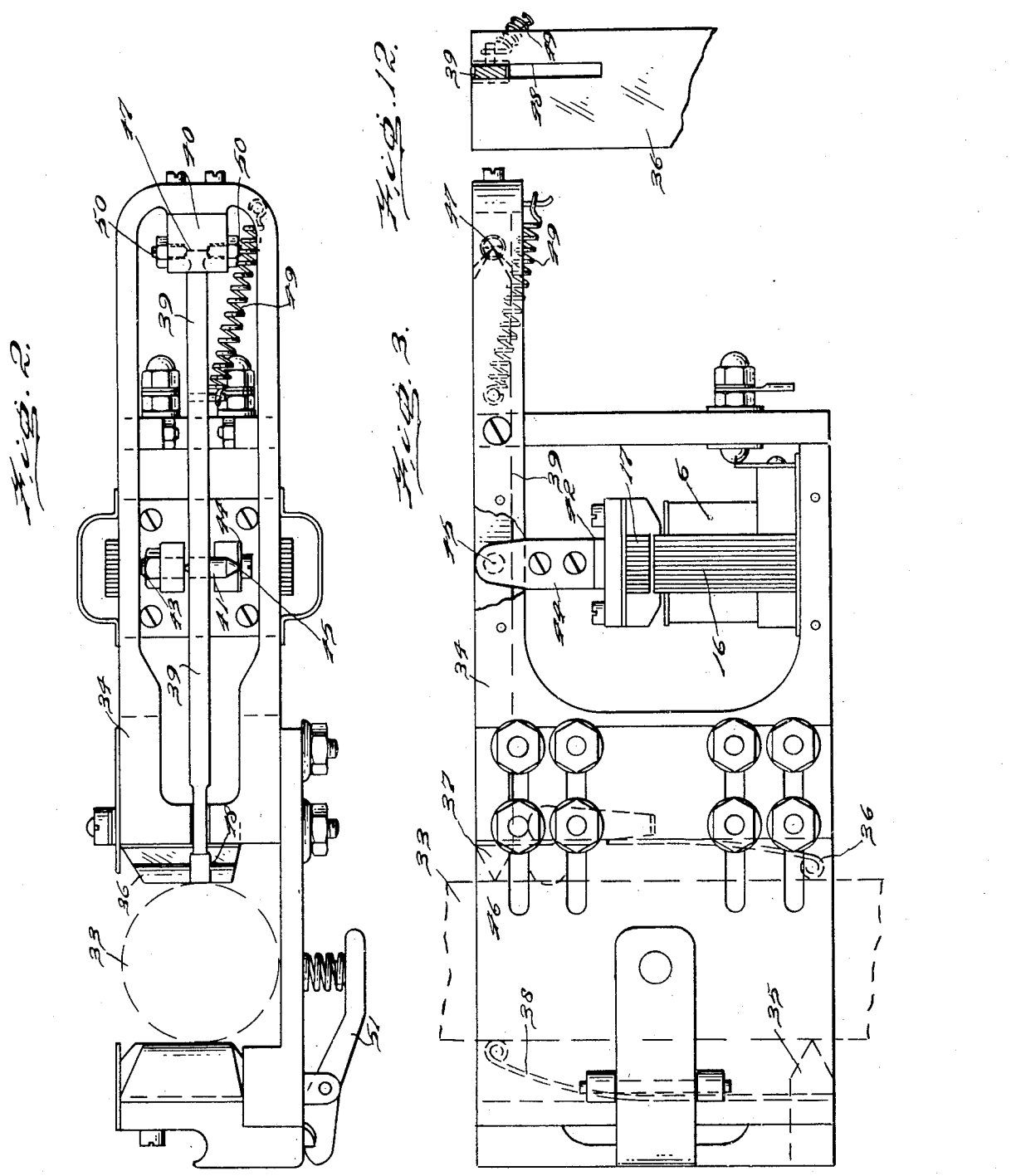

Nov. 14, 1939.  J. SIVERTSEN  2,180,175
METHOD OF AND APPARATUS FOR MEASURING SMALL CHANGES IN LENGTH
Filed May 28, 1937   3 Sheets-Sheet 3
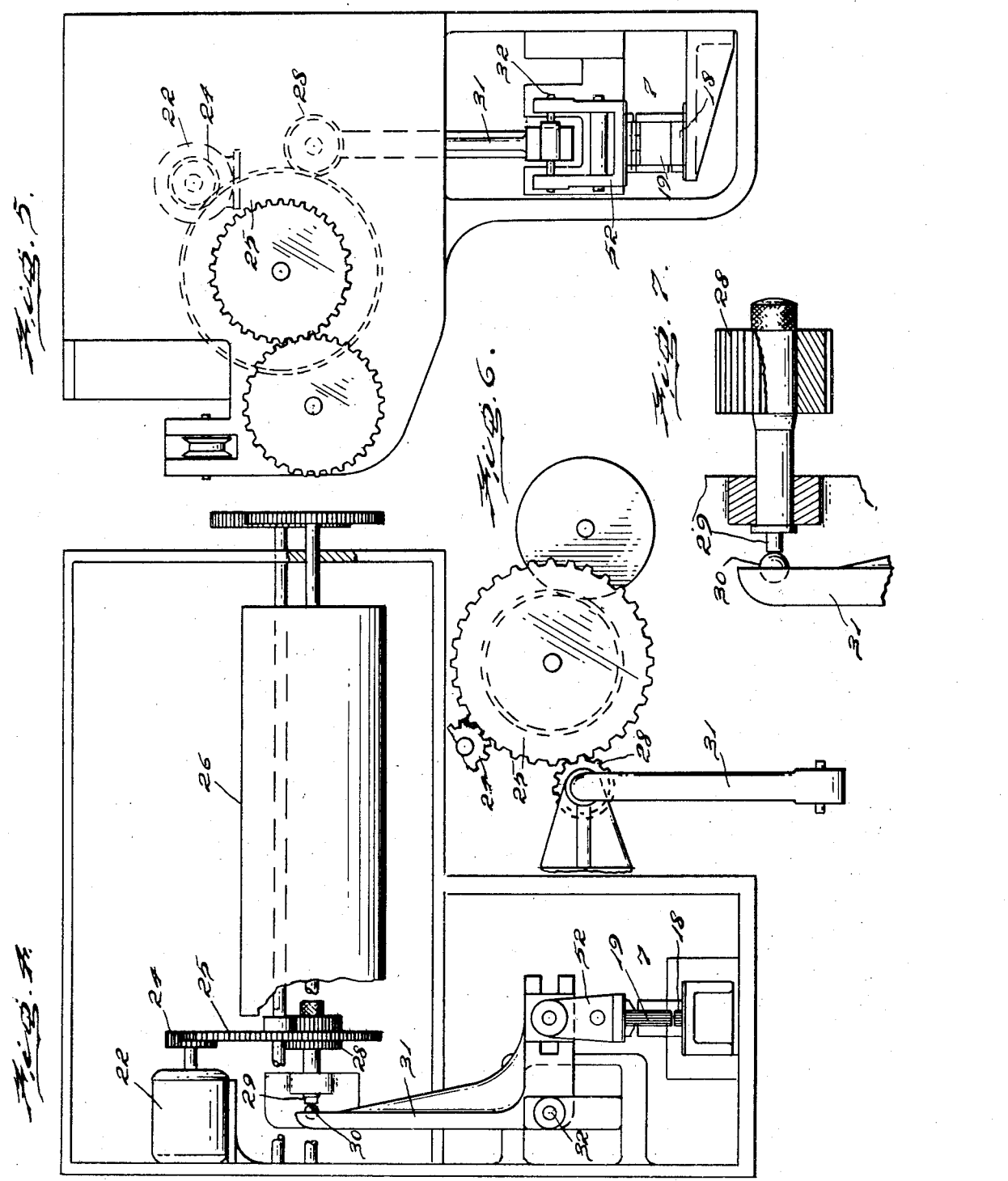
INVENTOR
Jens Sivertsen
BY
Herbert P. Fairbanks
ATTORNEY Patented Nov. 14, 1939

2,180,175

UNITED STATES PATENT OFFICE 2,180,175

METHOD OF AND APPARATUS FOR MEASURING SMALL CHANGES IN LENGTH

Jens Sivertsen, Philadelphia, Pa., assignor to Tinius Olsen Testing Machine Company, Philadelphia, Pa., a corporation of Pennsylvania Application May 28, 1937, Serial No. 145,194

4 Claims. (Cl. 177—351)

In a copending application, I have described and broadly claimed a novel method of and apparatus for measuring small changes in length and particularly the changes of length taking place in a specimen under stress in a testing machine. A change in length of the specimen under test caused a change in configuration of electrical parts to cause an electrical voltage change in a circuit which was amplified to drive an electric motor to cause a readjustment of said configuration where the change occurs.

In my present invention, I eliminate any mechanical connection between the motor driven parts and the parts that connect with the specimen. The instrument should operate and also record length with approximately the same relative accuracy, i. e. in per cent of the elongation. The apparatus is therefore easier to operate, cheaper to manufacture, and a high degree of accuracy is obtained. It has fewer mechanical parts to be driven by the motor, thereby enabling one to use a smaller motor. The accuracy we are aiming at, can easily be found as follows: If the apparatus is used to determine the modulus of elasticity of steel having a proportional limit of 30,000 lbs. per square inch, the total elongation up to this limit is approximately .001 per inch specimen. In a standard specimen of 2" gauge length we therefore get an elongation of .002". If one desires an accuracy of one tenth of one per cent, or $\frac{1}{1000}$ of $\frac{2}{1000}$", the necessary accuracy is $\frac{2}{1000000}$ or 2.10 inches, and if the accuracy expected is one-half per cent, the necessary accuracy is 5.10".

If the apparatus is to have the versatility of a commercial product, it must also be able to measure much greater distances, possibly not so accurately considering the use.

After the elastic limit has been passed, many specimens will elongate considerably with a small increase in load, in some instances as much as ten per cent or more. A ten per cent elongation is equal to 0.2. If the specimen breaks, it should not cause breaking of the instrument.

These requirements are very difficult to accomplish if a balanced mechanical configuration has to be maintained in a small instrument attached to the specimen and with a drive shaft cooperating to effect it mechanically, as it is difficult to keep the alignment of the shaft and other arrangements working properly without a complicated structure.

In accordance with the present invention, an electrostatic or an electromagnetic unit has an air gap affected by a change in length of the specimen. A second unit, carefully matched to be electrically equal to the first unit is located at a different place in the equipment and electrically balanced against the first unit, and this second unit is readjusted to restore the balance to the electrical circuit. To state it more simply, a change in distance causes an electrical change in the electric circuit which causes a voltage, and this voltage will, by electromotive means, cause another voltage equal to the first voltage.

The accuracy of the system is therefore dependent on the degree to which the two electrical units having air gaps are equal.

With the above and other objects in view as will hereinafter clearly appear, my invention comprehends a novel method of and apparatus for measuring small changes in length.

Other novel steps of the method and features of construction will be set forth in the detailed description and the appended claims.

For the purpose of illustrating the invention, I have shown in the accompanying drawings typical embodiments of it, which in practice, will give satisfactory and reliable results. It is, however, to be understood that the various instrumentalities of which my invention consists can be variously arranged and organized, and my invention is not limited to the exact arrangement and organization of these instrumentalities as herein set forth.

Figure 1 is a diagrammatic view illustrative of the mechanical parts and the electrical circuits, for carrying out in practice my novel method.

Figure 2 is a top plan view of the instrument.

Figure 3 is a side elevation of the instrument.

Figure 4 is a side elevation partly broken away of an electric unit and indicating or recording mechanism.

Figure 5 is an end elevation of Figure 4.

Figure 6 is a detail of gearing seen in Figures 4 and 5.

Figure 7 is a side elevation on an enlarged scale and partly broken away of a portion of Figure 4.

Figure 8 is an elevation of a modified coil and lever arrangement which can be substituted for that seen in Figure 1.

Figure 9 is an elevation of a modified form of the other coil and lever arrangement seen in Figure 1.

Figure 10 is an enlarged detail of the laminations of the coil 6, showing the position the parts assume when the upper laminations are fixed to the lever and in center position.

Figure 11 is a view similar to Figure 10 but showing the relative position of the laminations of a coil when the upper laminations are fixed to the lever and the air gap opened.

Figure 12 is a sectional detail.

Similar numerals indicate corresponding parts.

Referring to the drawings:

1 and 2, referring first to Figure 1, are two electrical resistors which are matched equal, to a high degree of accuracy, and which are supplied with alternating current from a source of electric supply through a plug 3. 4 and 5 are adjustable resistors. 6 and 7 are coils which are supplied with electrical energy from the plug 3. The coil 6 is supplied through resistor 4 and a conductor 8, and a conductor 9 leads from the coil 6 to a point 10 which is one side of an impedance 11 forming part of a control 12. This control may be of any desired or conventional character. It may or may not have thermionic valves, or it may have relays. The impedance 11 may be the primary of an input transformer, or the coil of a relay. The coil 7 obtains its electrical energy from plug 3 through variable resistors 5, conductors 13 and return conductor 14 leading to the point 10 of the control 12.

The resistor 4 and resistor 5 are used for the following reasons:

If the resistance part of the impedance in the coil 6 including the losses in the iron core 16 and 17 and the resistance in the conductors 8 and 9 is not equal to that of the opposing coil 7 including the losses in the core 18 and 19 of coil 6 and the resistance in conductors 13 and 14, then a balance can be obtained by the adjustable resistors 4 and 5.

The cores 16—17 and 18—19 are laminated.

The total resistance from point 20 through coil 6 to point 10 can thus be made equal to the resistance between point 21 through coil 7 and point 10. By adjustment of the air gap in coil 7, we can make the inductance of coil 7 equal to the inductance of coil 6, since the two resistors 1 and 2 are very closely matched.

We do not have any voltage between points 15 and 10, and no current in the impedance 11 of the control 12, when the adjustments of resistors 4 and 5, and the air gaps in coil 7, has been completed as outlined.

The control 12 is electrically connected to a motor 22 to control its direction of rotation. The current supply for the motor may be either A. C. or D. C. and is led from its source of supply through a plug 23.

The control 12 may also control the speed of the motor in any conventional manner well known in the art of motor control, depending on the voltage between points 10 and 15.

The shaft of the motor 22 drives directly or indirectly by a gear 24, a gear 25 on the shaft of a drum 26 to drive the drum or pointer 27.

The motor 24 also drives a gear 28 on a micrometer screw 29. This drive may be direct or through intermediate gears.

The rotation of the micrometer screw, the drum and the pointer are thus synchronized.

One end of the micrometer screw bears against a ball 30 inserted in and end of a bell crank lever 31 fulcrumed at 32 to a fixed point. The opposite end of the lever 31 has the lamination 19 pivoted or fixed to it. The fixation of lamination 19 to lever 31, and lamination 17 to lever 39 can be accomplished in two ways. One way is as shown in Figures 8 and 9. The other way is as shown in Figures 1, 2, 3, 4 and 5. The relative merits of these two arrangements will be explained. The laminations 18 and 19 together with the fields of the coil 7 forms an inductance.

Instead of using laminations, an electrostatic arrangement can be used such as for example two cooperating metal plates forming a condenser.

33 designates the specimen under test, which is being stressed in a testing machine. An extensometer 34 is clamped on the specimen by the knife edge 35 and spring 36 are rigidly connected to the frame of the extensometer when the specimen is clamped in position. The specimen is also clamped between the spring 38 and the knife edge 37 on a tool steel lever 39 which at its opposite end bears against a tool steel pivot 40 which forms a part of the rigid frame of the extensometer 34. The laminations 17 in Figures 1, 2 and 3 are pivotally connected with the lever 39, and, with the laminations 16 and coil 6, form an inductance substantially equal to that of the laminations 18 and 19 and coil 7.

When the specimen 33 is stressed, the distance between the knife edges will vary, and, assuming that an elongation takes place, the lever 39 will move on its pivot and the laminations 17 will make a proportional outward movement, thereby opening up the air gap to create an unbalance in the electrical network. This causes the control 12 to regulate the motor 22 to cause it to revolve in a direction to drive the micrometer screw 29 to actuate the lever 31 to open the air gap between laminations 18 and 19, and when the opening between laminations 18 and 19 is the same as between 16 and 17, the inductances are equal, and the electrical unbalance caused by laminations 17 and coil 6 have been matched by the unbalance in coil 7, due to the movement of the laminations 19.

To express it more correctly, the two movements are equal when the electrical unbalance caused by the movement of laminations 17 is matched by that caused by the movement of the laminations 19.

The amount of rotation by the micrometer screw is one measurement, and the rotation of the indicating pointer 27 or the drum 26, indicates or records the amount of elongation of the specimen.

The system, as shown in very simple. The difficulties are to make the two air gaps, the one in the extensometer and the one remote therefrom, open up in exactly the same manner. If this is not accomplished, the errors are so great that the apparatus will be without merit.

The arrangement with a lever to obtain, instead of a straight lined movement of the laminations, a rotating movement of the lever and the laminations around the seat in the pivot member 40, and around the pivot 32, the construction shown in Figures 8 and 9 will give good results. However, if this arrangement is used, the distances $a$ and $a'$ and $b$ and $b'$, must be respectively made equal, as shown in Figures 8 and 9.

In Figure 10 the laminations are shown in starting position, while in Figure 11 they are shown as they appear after the air gap has opened. The opening is unequal as the upper laminations take a certain angle compared to their former position. By making $a$ equal $a'$, and $b$ equal $b'$, we get very good results, and the limits of the obtainable accuracy using this method are the smoothness of the laminations.

A better method is shown in Figures 1 to 6. The upper laminations are here shown as being hung on a pivot point on the lever. By true rotating movements we thereby obtain a straight line opening of the air gaps. The lever 39 is inserted in a pointed, hardened piece of drill rod 41. A flat spring 44 with a seat 45 is fastened to the piece 42. A screw 43 is threaded into the part 42 and has a seat for the other end of the piece 41. The axis of 42 is located on a line between points 46 and 47. 46 is a contact point between the lever 39 and the specimen 33, and 47 is the contact point between the lever 39 and the pivot member 40. The piece 42 and laminations 17 are free to rotate around the point 45. When the lever 39 including the axis 45, rotates around the point 47, and 42 rotates around point 45, we have two rotating movements. For small movement of the point 46, we will therefore have a straight lined opening of the air gaps. Substantially the same arrangement is employed for the laminations 19 to obtain a straight lined opening of the air gap. Under these conditions, the two laminations do not need to have the same distance from their respective pivotal points as they both open in a straight line direction.

It is important that the movement of the lever 39 takes place in substantially a single plane and for this reason I provide means to guide the free end of the lever, and resilient means to cause such free end to be retained against a polished guide.

As shown in Figure 12, the spring 36 is slotted at 48, so that a wall of the spring forms a guide for the free end of the lever which is highly polished to reduce friction. A spring 49 has one end connected to a side of the lever and its other end connected to the frame, thereby tending to retain the free end of the lever against the guide. The pivot forming members 50 are adjustable for proper positioning of the fulcrum of the lever. When the extensometer is clamped to a specimen to be tested, it is locked in the usual manner by a locking lever 51.

The trunnions forming the pivot 32 carry a weight 52, see Figures 4 and 5, the purpose of which is to keep the laminations 19 hanging vertically as the lever 31 rotates on its fulcrum 32.

It is to be understood that where in the claims I refer to a specimen, it is not with the limited interpretation of a part taken from a whole for the purpose of testing, since it is intended to include not only a part selected or cut out for a specimen but as well any object, body or mass of material of which a test is to be made.

Having thus described by invention, what I claim as new and desire to secure by Letters Patent is:

1. An extensometer for measuring changes in length of a specimen under stress, comprising a frame, means on the frame to clamp the specimen in one section, means on the frame including a spring and lever to clamp the specimen in another section a predetermined distance from said first section, said lever being fulcrumed at one end and having a contact point at the opposite end, and a magnetic unit having a laminated core pivotally supported by said lever at a point between its contact point and fulcrum and having a cooperating laminated magnetic core rigidly fixed to the frame of said extensometer and said magnetic unit changing its electrical characteristics due to movements of said lever.

2. An extensometer for measuring changes in length of a specimen under stress, comprising a frame, means on the frame to clamp the specimen in one section, means on the frame including a spring and lever to clamp the specimen in another section a predetermined distance from said first section, said lever being fulcrumed at one end and having a contact point at the opposite end, a magnetic unit having a laminated core pivotally supported by said lever at a point between its contact point and fulcrum and having a cooperating laminated magnetic core rigidly fixed to the frame of said extensometer and said magnetic unit changing its electrical characteristics due to movements of said lever and means to prevent lateral movement of said lever during its turning movement.

3. An extensometer for measuring changes in length of a specimen under stress, comprising a frame, means on the frame to clamp the specimen in one section, means on the frame including a spring and lever to clamp the specimen in another section a predetermined distance from said first section, said lever being fulcrumed at one end and having a contact point at the opposite end, a magnetic unit having a laminated core pivotally supported by said lever at a point between its contact point and fulcrum and having a cooperating laminated magnetic core rigidly fixed to the frame of said extensometer and said magnetic unit changing its electrical characteristics due to movements of said lever, means to prevent lateral movement of said lever during its turning movement, a guide fixed to said frame, and resilient means tending to move the free end of said lever towards said guide.

4. An extensometer for measuring changes in length of a specimen under stress, comprising a frame, means on the frame to clamp the specimen in one section, means on the frame including a spring and lever to clamp the specimen in another section a predetermined distance from said first section, said lever being fulcrumed at one end and having a contact point at the opposite end, a magnetic unit having a laminated core pivotally supported by said lever at a point between its contact point and fulcrum and having a cooperating laminated magnetic core rigidly fixed to the frame of said extensometer and said magnetic unit changing its electrical characteristics due to movements of said lever, means to prevent lateral movement of said lever during its turning movement, a guide fixed to said frame, resilient means tending to move the free end of said lever towards said guide, and means for adjusting the fulcrum at the end of said lever.

JENS SIVERTSEN.